ELECTRONICALLY TUNED OSCILLATOR

Filed Nov. 15, 1963 4 Sheets-Sheet 1

INVENTOR
Ralph L. Barkes
BY
Blair and Buckles
ATTORNEYS

Nov. 15, 1966 R. L. BARKES 3,286,194

ELECTRONICALLY TUNED OSCILLATOR

Filed Nov. 15, 1963 4 Sheets-Sheet 2

INVENTOR
Ralph L. Barkes
BY
Blair and Buckles
ATTORNEYS

ELECTRONICALLY TUNED OSCILLATOR

Filed Nov. 15, 1963

4 Sheets-Sheet 3

INVENTOR
Ralph L. Barkes
BY
Blair and Buckles
ATTORNEYS

Nov. 15, 1966 R. L. BARKES 3,286,194
ELECTRONICALLY TUNED OSCILLATOR
Filed Nov. 15, 1963 4 Sheets-Sheet 4
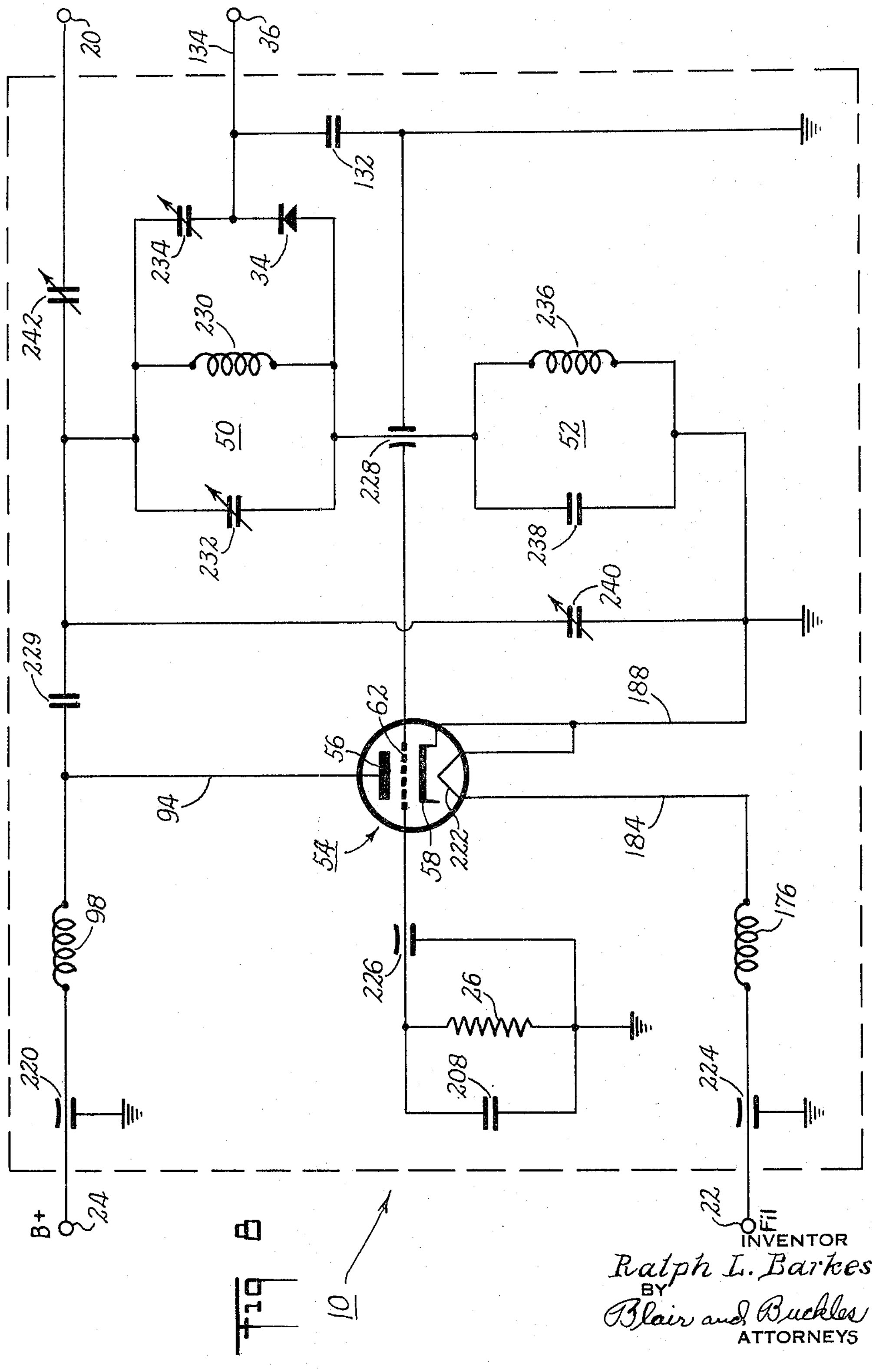
INVENTOR
Ralph L. Barkes
BY
Blair and Buckles
ATTORNEYS United States Patent Office 3,286,194

Patented Nov. 15, 1966

3,286,194

ELECTRONICALLY TUNED OSCILLATOR

Ralph L. Barkes, Tampa, Fla., assignor to Trak Microwave Corporation, Tampa, Fla.

Filed Nov. 15, 1963, Ser. No. 323,931
6 Claims. (Cl. 331—97)

The present invention relates to radio frequency devices having distributed parameter circuits. More specifically, it relates to a variable frequency microwave source and particularly a vacuum tube triode oscillator of extremely light weight and small physical size.

The emphasis on miniaturization occasioned by the severe space and weight requirements which must be satisfied in the design of airborne equipment, as for example, communications systems, has presented a considerable challenge to industry. The electronics industry, in particular, has responded to this challenge by developing miniaturized circuit elements as well as miniaturized system components.

In addition to meeting space and weight requirements, airborne equipment and their component parts must be of particularly rugged design to withstand extreme vibrational shocks and inertial forces without damage.

In the area of the present invention, the challenge has been most pressing. Microwave sources are essential components of airborne and space communications systems and, as a result, are required to be small and compact. Unfortunately, as the physical size of these components are reduced to within the prescribed limits, the output power is severely limited.

A further troublesome area involves the problem of frequency tuning such microwave sources. In certain microwave sources, particularly vacuum tube triode oscillators, two distributed parameter circuits or resonators are employed, one as an output resonator and the other as an input resonator. In the past, in order to establish a particular operating frequency, the parameters of both resonators were varied conjunctively in order to frequency tune the oscillator.

It is therefore an object of the present invention to provide a microwave source of extremely small size and light weight construction and yet, capable of developing appreciable output power despite its small size.

A further object is to provide a microwave source of simplified design in that it is easily fabricated and readily assembled and yet, of rugged construction.

An additional object is to provide a variable frequency microwave source employing plural resonators where variable frequency tuning of the source is effected by selectively varying the parameters of only a single resonator.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIGURE 8 is a schematic diagram of a microwave source embodying the invention.

Figures 1, 2:
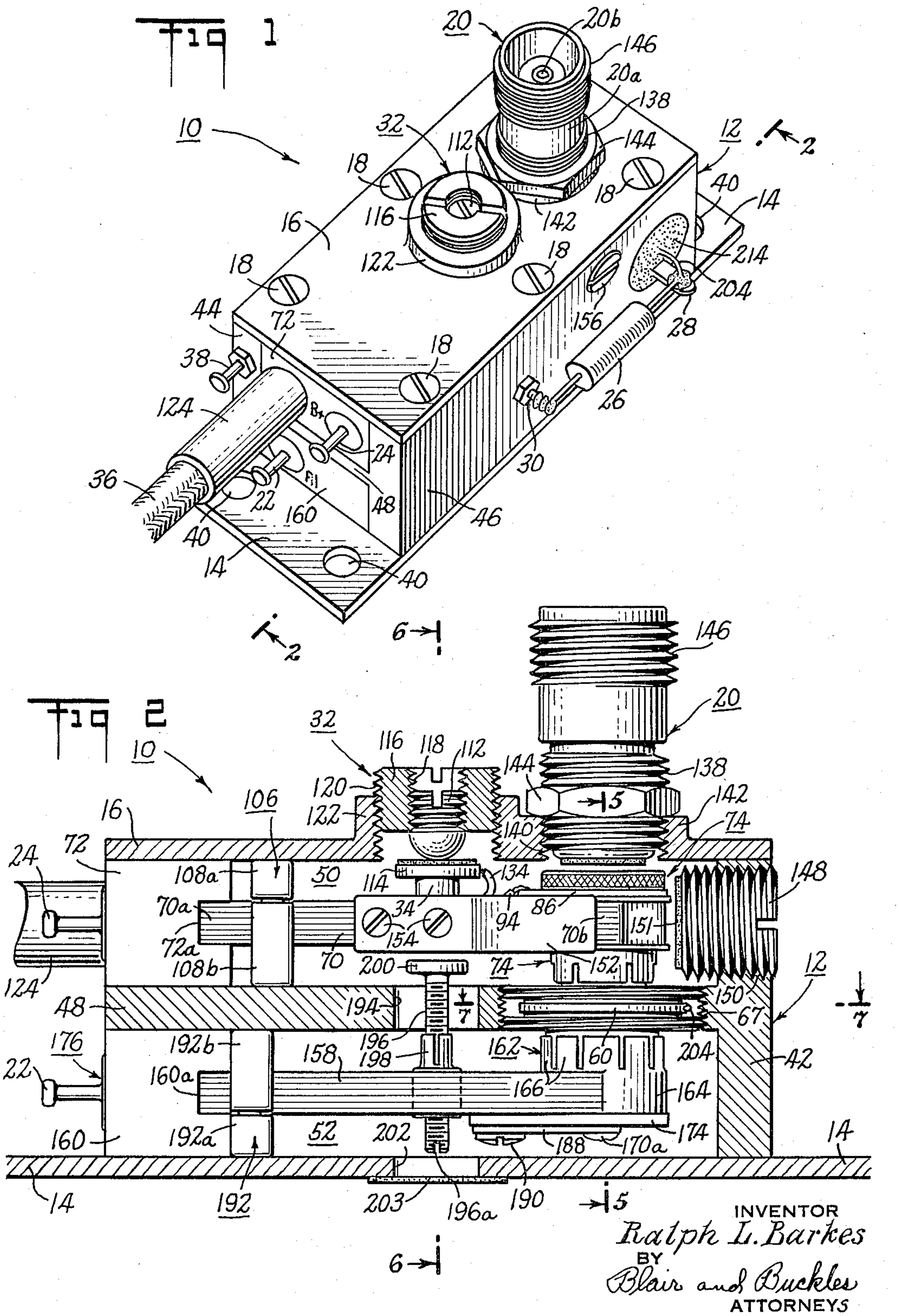
FIGURE 1 is a perspective view of a microwave source embodying the invention.
FIGURE 2 is an enlarged sectional side elevation view of the source of FIGURE 1 taken along line 2—2 of FIGURE 1.

In general and as seen in FIGURE 1, a source 10 embodying my invention has an electrically conductive housing 12, a bottom plate 14, and a cover plate 16. The bottom plate 14 and the cover plate 16 are secured to the housing 12 by a plurality of screws 18 as shown securing the cover plate to the housing. The cover plate 16 is fitted with an output connector 20 for extracting the desired radio frequency output signal from the source 10 for application to an output load. As an example of the miniature size of source 10, in one physical embodiment of my invention, the housing 12 is two inches long, one inch wide and seven-eighths of an inch in height.

As further seen in FIGURE 1, terminal posts 22 and 24 provide for external circuit connection to a filament voltage supply (not shown) and a plate or B+ supply (not shown), respectively. These supply sources provide the necessary D.C. energization for operation of the source 10. A grid leak resistor 26 is connected between a grid terminal post 28 and a ground terminal post 30, mounted in electrically conductive engagement with the housing 12.

Figure 3:
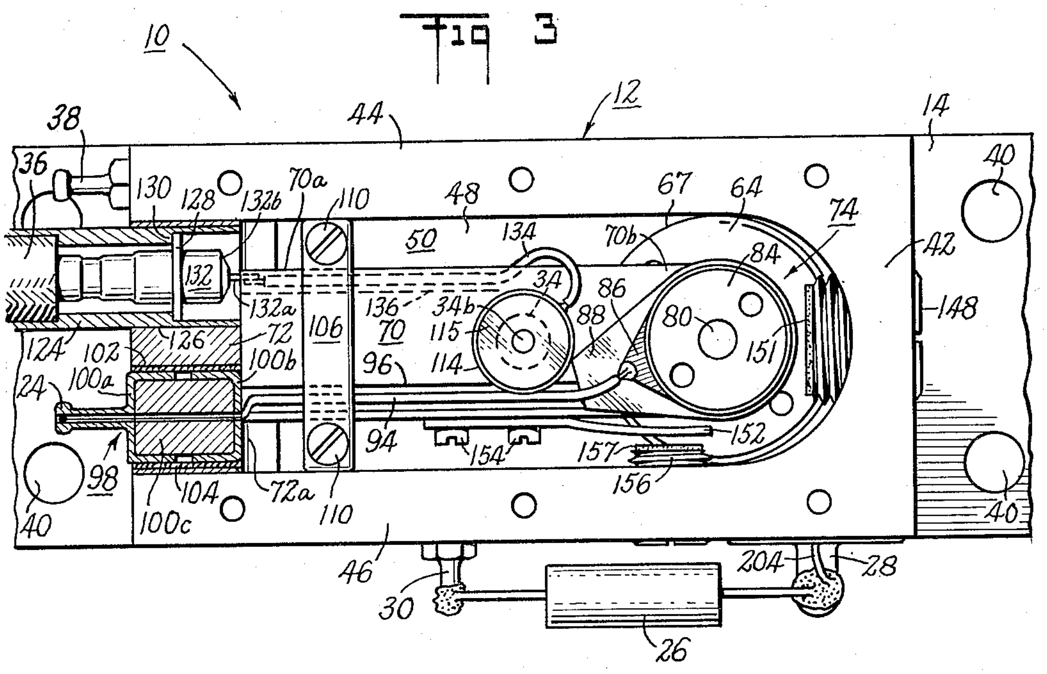
FIGURE 3 is a top plan view, partly broken away, of the source of FIGURE 1 and FIGURE 2 with the cover plate removed to show the interior thereof.
Figure 6:
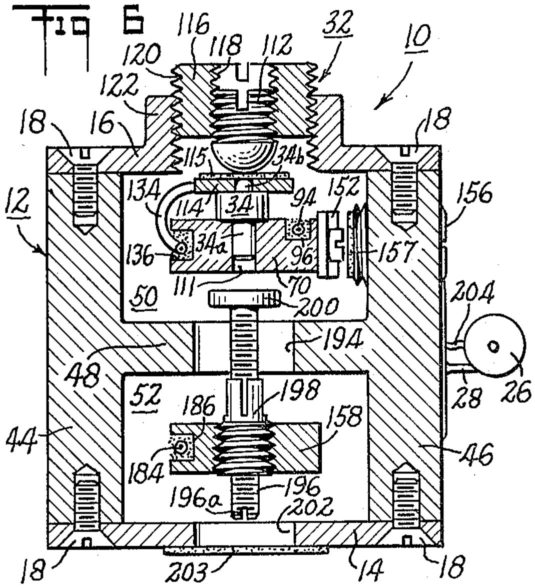
FIGURE 6 is a sectional end elevation view taken along line 6—6 of FIGURE 2.

Cover plate 16 is further fitted to receive a tuning screw assembly 32 for mounting a varactor diode 34, shown in FIGURES 2, 3 and 6, within the housing 12. A cable 36 supplies a D.C. biasing voltage to the varactor 34. A ground terminal post 38 in conductive engagement with the housing 12, is provided for external ground circuit connection of the source 10. The bottom plate 14 is provided with holes 40 to facilitate mounting of the source 10 to a chassis (not shown).

The housing 12, as more clearly seen in the remaining figures of the drawings, is preferably formed as an integral aluminum casting having an end wall 42 and a pair of side walls 44 and 46 (FIGURE 3). A partition 48, integral with the side walls 44, 46, and end wall 42 divides the housing into two substantially equal resonant cavities, a plate cavity 50 and a cathode cavity 52 (FIGURES 2 and 6). This physical arrangement of the two cavities 50 and 52, one over the other, is a major factor in reducing the physical size of the source 10. The end wall 42 has a semi-circular internal surface configuration and thus blends into the interior surface of side walls 44 and 46 to ensure a uniform voltage distribution in the cavities 50 and 52 in the vicinity of the end wall.

Figure 5:
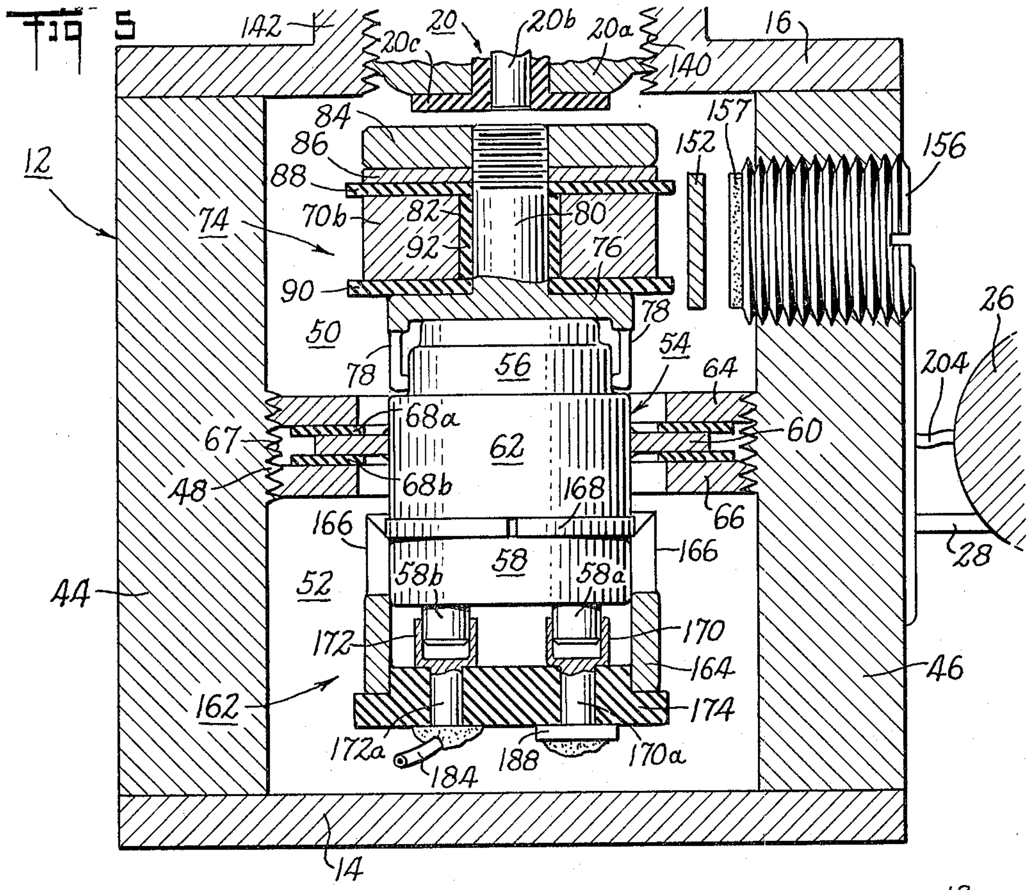
FIGURE 5 is an enlarged sectional end elevation view taken along line 5—5 of FIGURE 2.

As most clearly seen in FIGURE 5, a triode 54, capable of high frequency operation, is rigidly mounted in the partition 48 near end wall 42 such that its anode terminal 56 is disposed in the plate cavity 50 and its cathode terminal 58, including filament terminals **58*a* and 58*b*, is disposed in the cathode cavity 52. In order to fixedly mount the triode 54, a grid contacting ring 60, affixed to the grid terminal ring 62 of triode 54 by suitable means is clamped between grid nuts 64 and 66 which are threaded into an aperture 67 in the partition 48 adjacent the end wall 42 of the housing 12. The grid terminal ring 62 of triode 54 and the grid contacting ring 60 are insulated from the partition 48 and thus housing 12 by insulating washers 68*a* and 68*b* disposed between the grid contacting ring 60 and the grid nuts 64 and 66** (FIGURE 5).

Returning to FIGURE 2, an anode line 70 is supported at its one end 70a in an anode line support member 72 disposed in the open end of cavity 50. Support member 72 is retained in place preferably by a dip brazing process while end 70a of the anode line 70 is likewise retained in a slot 72a in the support member. The free end 70b of the anode line 70 is provided with an anode contact assembly 74 electrically contacting the anode terminal 56 of tube 54.

The anode contact assembly 74, as more clearly seen in FIGURE 5, includes a cup-shaped anode contact 76 integrally formed with circumferentially spaced resilient fingers 78 for gripping the anode terminal 56 and a stud 80 which extends through a hole 82 provided in anode line 70. A nut 84 threadedly engages stud 80 to clamp a connector 86 to the anode contact assembly 74 and the contact assembly to the anode line 70. The anode D.C. supply circuit through the assembly 74 from connector 86 through nut 84, stud 80, contact 76 and fingers 78 to anode terminal 56 of triode 54 is insulated from the anode line 70 by a pair of insulating washers 88 and 90 and an insulating sleeve 92.

Connection between the external anode terminal post 24 and the connector 86, as seen in FIGURE 3, is effected by an anode lead 94 which lies in a longitudinal groove 96 provided in the anode line 70. The groove 96 is filled with an epoxy resin to retain lead 94 therein. Incorporated with the terminal 24 and the lead 94 is a radio frequency choke 98 for preventing radio frequency energy from leaking from the plate cavity 50 on lead 94 to terminal post 24. The choke 98 comprises a cup-shaped front terminal 100a and a cup-shaped rear terminal 100b spaced apart by an intervening ferrite rod 100c. The radio frequency choke 98 is inserted in a hole 102 provided in anode line support 72 and is insulated therefrom by a wrapping 104 of insulation such as Mylar tape to provide shunting by-pass capacity to support 72 at radio frequencies while the ferrite rod 100c acts as a high impedance series inductor at radio frequencies. The anode wire 94 is threaded through the central bore in the choke parts and electrically connected by solder to the anode external terminal post 24 integrally formed with the front choke terminal 100a to complete the low impedance D.C. path to the anode contact assembly 74 where lead 94 is soldered to connector 86.

As seen in FIGURES 2 and 3, a shorting block 106 is formed in two parts; an upper member 108a and a U-shaped lower member 108b joined together by screws 110. The shorting block 106 is adapted to embrace the anode line 70 and thus define the left-hand boundary of plate cavity 50. Loosening of the screws 110 allows the shorting block 106 to be adjustably positioned along the anode line 70 and thus vary the dimensions of the anode cavity 50. The shorting block 106 thereby provides for coarse frequency tuning of the anode cavity 50 and is employed in the present invention to establish the center frequency of operation of the source 10.

Still in connection with FIGURES 2, 3 and also as seen in FIGURE 6, the varactor 34 is positioned in the anode cavity 50 to provide electronically controlled, variable frequency tuning of the source 10 in a manner to be described. The varactor 34 has its lower terminal 34a disposed in a hole 111 in the anode line 70 and is clamped in place by the advancement of an inner screw 112 of tuning screw assembly 32 against a diode terminal cap 114 in electrical contact with the upper terminal 34b of varactor 34. The diode terminal cap 114 is insulated from the screw 112 by insulation 115. Tuning screw assembly 32 further includes an outer tuning screw 116 having an axial threaded bore 118 for receipt of the inner screw 112 and an external thread portion 120 for threaded engagement with a collar 122 and the cover plate 16. The outer tuning screw 116 may be adjustably positioned to vary the capacity between varactor 34 and cover plate 16.

As most clearly seen in FIGURE 3, the bias cable 36 is fitted with a sleeve 124 which is inserted in a hole 126 provided in anode line support 72 and retained in place by any convenient means such as conductive epoxy. The terminal end of bias cable 36 retained within sleeve 124 by a flange 128 which seats against an internal shoulder 130, is electrically connected to the inner terminal 132a of coaxial capacitor 132. Capacitor outer terminal 132b is electrically connected to the housing 12 via flange 128, sleeve 124 and support 72. A bias lead 134 retained in a groove 136 provided in the lateral surface of the anode line 70 makes circuit connection between the inner terminal 132a of coaxial capacitor 132 and the diode cap 114 of varactor 34. The capacitor 132 isolates the D.C. biasing voltage from the housing 12 while providing a shunt circuit path at radio frequencies for high frequency signals leaking from plate cavity 50.

Returning to FIGURES 2 and 5, the coaxial output connector 20 has a lower threaded portion 138 and is advanced through a threaded bore 140 provided in a collar 142 and the cover plate 16 into the plate cavity 50. The output connector 20 includes an outer coaxial conductor 20a in electrical contact with the housing 12 and a coaxial inner conductor 20b spaced apart by an intervening dielectric medium 20c as particularly seen in FIGURE 5. A locknut 144 engaging threaded portion 138 provides for adjustment of the degree of penetration of the lower end of the inner conductor 20b into the plate cavity 50. By adjusting the degree of penetration of the lower end of the inner conductor 20b, the amount of radio frequency energy extracted from cavity 50 may be varied correspondingly. The upper end of the output connector 20 is provided with a threaded portion 146 to facilitate attachment of an output coaxial line.

To provide for further capacity tuning of plate cavity 50, a tuning screw 148, seen in FIGURES 2 and 3, is advanced to the desired degree of penetration into cavity 50 through a threaded hole 150 provided in end wall 42 of the housing 12. The inner end of the tuning screw 148 is coated with insulation 151 to prevent direct electrical contact between the tuning screw and the anode line 70 when the former is advanced to the maximum degree of penetration.

In order to compensate for the effects of temperature variations on the resonant frequency of the cavity 50, a "widget" 152, seen most clearly in FIGURE 3, formed of bimetallic material is affixed to the lateral edge of anode line 70 by screws 154. As the temperature increases, the free end of the widget 152 deflects upwardly as seen in FIGURE 3 to substantially offset the capacity changes caused by thermal expansion of the housing 12 with increasing temperatures. To calibrate the temperature compensating widget 152, a set screw 156, seen also in FIGURE 5, is threaded through side wall 46 of housing 12. The variable relationship between the free end of widget 152 and the inner end of set screw 156 varies temperature compensating effect of the widget. The inner end of set screw 156 is covered with insulation 157 to prevent direct electrical contact against the widget 152.

Figure 4:
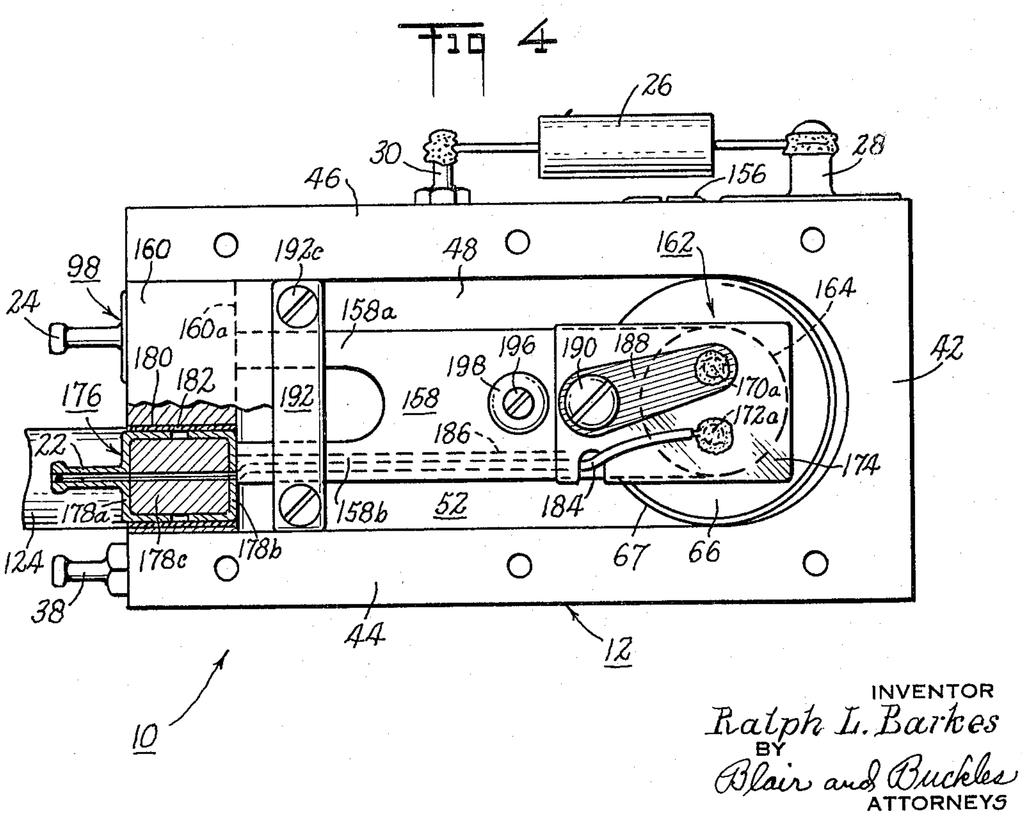
FIGURE 4 is a bottom plan view, partly broken away, of the source of FIGURES 1, 2 and 3 with the bottom plate removed to show the interior thereof.

Turning now to a consideration of the cathode cavity 52, as seen in FIGURES 2, 4, and 5, a cathode line 158 is mounted in a cathode line supporting member 160. The cathode line 158 is formed having bifurcated end portions 158a and 158b which are retained in a slot 160a in support 160 by dip brazing, for example. Support 160 is received in the open end of cathode cavity 52 and secured therein by any suitable means, such as dip brazing. The free end of the cathode line 158 supports a cathode contact assembly 162 for electrical connection with the cathode terminal 58 of the tube 54. The cathode contact assembly 162 includes a cylindrically shaped contact 164 having circumferentially spaced resilient fingers 166 at one end thereof for engaging the cathode terminal 58 of the tube 54. To insure good electrical contact between the cathode terminal 58 and the contact 164, the cathode terminal is grooved to receive a split ring 168 such that as the contact 164 is telescoped over the cathode terminal 58, the resilient fingers 166 ride over the protruding surface of the split ring 168. The filament terminals **58*a* and 58*b* of tube 54 are engaged by filament contact members 170 and 172. These filament contact members are mounted by integrally formed stems 170*a* and 172*a* which extend through a filament block 174** made of insulative fiberglass material, thereby electrically insulating one from the other.

Turning to FIGURE 4, the filament terminal post 22, like the external anode terminal post 124, is incorporated with a radio frequency choke 176 functioning in the same manner as choke 98. Accordingly, a front terminal **178*a* integrally formed with the external filament terminal 22 and a rear terminal 178*b* with an intervening ferrite rod 178*c* are retained as a unit in a hole 180 provided in the cathode line support 160 and insulated therefrom by a wrapping 182 of Mylar tape. A filament lead 184, recessed in a groove 186 extending along the lateral edge of the cathode line 158 and through the central bore in the choke parts connects the terminal 22 to the stem 172*a* of filament contactor 172. A conductive link 188 provides a ground connection for the other side of the filament circuit. Link 188 has one end soldered to the stem 170*a* of filament contactor 170 and the other end conductively coupled to the cathode line 158 via screw 190**.

As in the case of the anode line 70, a shorting block 192 including an upper member **192*a* and a U-shaped lower member 192*b* embraces the cathode line 158 to terminate cathode cavity 52. Screws 192*c* provide releasing means for selective positioning of shorting block 192 to selectively vary the dimensions of cavity 52** and, by the same token, its resonant frequency.

In order to achieve oscillatory action of the source 10, communication between the anode cavity 50 and the cathode cavity 52 is provided by aperture 194 extending through partition 48 (FIGURES 2 and 6). To provide for effective coupling of the two cavities, a feedback screw 196 has a threaded portion engaged in a locknut 198 which in turn is threadedly mounted in the cathode line 158. One end of feedback screw 196 is formed in the shape of a disk 200 to enhance the coupling of the radio frequency energy from the plate cavity 50 to the cathode cavity 52. The other end of the feedback screw 196 is provided with a slot **196*a* to facilitate rotation by a tool which may enter the cathode cavity 52 through a hole 202 in the bottom plate 14. Hole 202 is normally sealed by an adhesive tape 203 to prevent entry of dust or other foreign matter. Rotation of the feedback screw 196 varies the degree of penetration of the disk portion 200 of the feedback screw 196 into the anode cavity 50 and thus the degree of capacitance coupling between cavities 50 and 52**.

Figure 7:
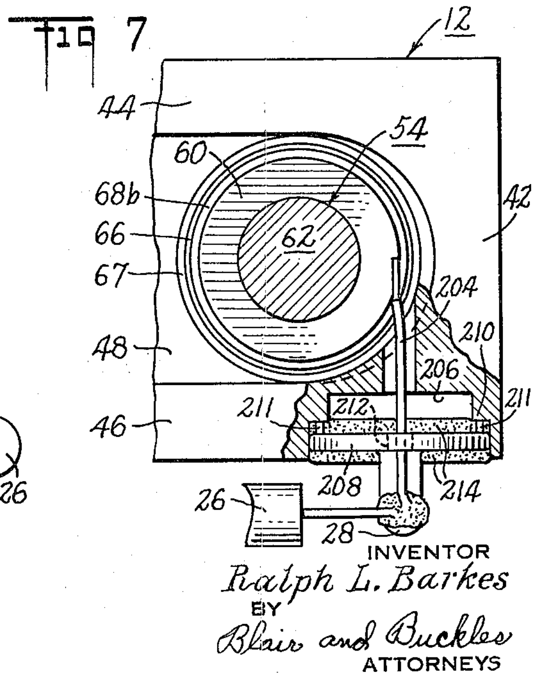
FIGURE 7 is a sectional top view taken along line 7—7 of FIGURE 2.

Considering the circuit for grid 62 as seen in FIGURES 3 and 7, a wire 204 extending through a hole 206 in side wall 46, couples the grid 62 of tube 54 to terminal post 28 and from terminal 28 through resistor 26 to ground terminal post 30. Wire 204 has one end soldered to grid contacting ring 60 which, in turn, engages grid 62 of tube 54. Terminal 28 also forms a plate connection for a capacitor 208 with a second plate connection being effected along an internal shoulder 210 in opening 206 by contactors 211. Capacitor 208 is retained in opening 206 by a conductive epoxy resin 214. Capacitor 208 is thus connected between the grid circuit formed in part by wire 204 which extends through a central aperture 212 in capacitor 208 and the housing 12 and to provide a low impedance shunt path for radio frequency signals. Thus the grid 62 is effectively grounded for radio frequency signals but, at D.C., is biased above ground by resistor 26.

In describing the operation of source 10 particular reference shall be made to FIGURE 8; a schematic diagram of the source 10. Schematic representations of circuit elements corresponding to parts physically illustrated in FIGURES 1 through 7, already discussed, are given corresponding reference numerals in FIGURE 8. The B+ supply of +120 volts, for example, is applied through radio frequency choke 98 to the anode 56 of triode 54. The triode employed in the disclosed embodiment of my invention may be a General Electric 7486/TK 9127, or its equivalent. The lumped capacity 220 represents that which exists between the anode supply circuit and the housing 12. The filament supply voltage of +6.3 volts is applied through radio frequency choke 176 to filament terminal **58*b*. The other end of the filament 222 at terminal 58*a* is tied to the cathode 58 and to ground through link 188. The lumped capacity 224 represents that existing between the filament circuit and the housing 12**.

The grid 62 of triode 54 is coupled to ground through grid leak resistor 26 and capacitor 208. Thus, the grid is grounded for radio frequency signals through capacitor 208 but is D.C. biased above ground by resistor 26. The capacity between this grid circuit and the housing 12 is represented by the lumped capacity 226. The grid 62 is capacity coupled to the partition 48 as represented by the lumped capacity 228.

The radio frequency signals at the anode 56 of triode 54 are capacitively coupled, as indicated at 229, to the plate cavity 50. The plate cavity is a distributed parameter electrical circuit and can be represented schematically as a tank circuit comprising the parallel combination of inductance 230 and capacitance 232. The capacitance 232 is shown as a variable capacitor to represent the variable capacitance component presented by the selective positioning of the plate cavity shorting block 106, tuning screw 148, and the combination of "widget" 152 and tuning screw 156. Electrically connected in parallel with the tank circuit is the variable capacity introduced into the plate cavity 50 by the tuning screw assembly 32 as represented by the variable capacitor 234.

The varactor 34, a Sylvania D5040 or its equivalent, electrically connected in series with the variable capacitor 234, adds an additional variable capacity to the plate cavity 50. A D.C. biasing voltage source applied to bias cable 36 causes the varactor 34 to present a certain amount of capacitance in the plate cavity 50. Since a biased varactor functions as a voltage variable capacitor, the magnitude of the biasing voltage determines the magnitude of capacitance introduced into the circuit. Accordingly, the capacity of the plate cavity 50 can be varied by varying the biasing voltage applied to varactor 34. The capacitor 132 connected to ground (shell 12) prevents radio frequency signals from leaking into the bias cable 36.

In order to insure maximum frequency tuning effect of the varactor 34, extraneous capacity shunting the capacitance presented by the varactor should be held to a minimum. One source of extraneous shunt capacity is the lead wires 94 and 134 disposed in their respective grooves in the anode line 70. To limit this shunt capacity, lead wire 134 should be limited to approximately 0.005 inch in diameter. The anode lead 94, necessarily of heavier duty, should be limited to a gage size of 30.

The cathode cavity 52 represented by the tank circuit consisting of the parallel combination of lumped inductance 236 and lumped capacitance 238 is electrically connected to the cathode 58 of triode 54. The feedback capacitive coupling between the plate cavity 50 and the cathode cavity 52 is represented by the variable capacitor 240 connected in parallel therewith. This capacity coupling is variable owing to the provision that the degree of penetration of the feedback screw 196 into the plate cavity 50 may be varied. In like manner, the output capacitive coupling indicated at 242 is variable since the degree of penetration into the plate cavity of the inner conductor **20*b* of output connector 20** is also variable.

According to the well-understood theory of operation, the electron beam developed by the triode 54 delivers energy to the plate cavity 50 to excite oscillations of electromagnetic energy therein. The frequency of oscillation is determined by the parameters of the plate cavity 50. A portion of this oscillating electromagnetic energy is coupled to the output connector 20 via coupling capacitor 242. In order to sustain oscillations in the plate cavity 50, a portion of this electromagnetic energy is coupled to the cathode cavity 52 via coupling capacitor 240 (feedback screw 196) for application across the grid 62 and cathode 58 of tube 54. By appropriately controlling the amplitude and phase of the energy feedback, the electron beam in the triode 54 may be controlled to reinforce the electromagnetic energy oscillating in the plate cavity 50 and sustained oscillatory energy regeneration is achieved.

Since the frequency at which electromagnetic energy will oscillate is determined by the parameters of the plate cavity 50, this resonant frequency can be established by adjustment of the capacities represented by variable capacitors 232, 234 and the biasing voltage applied to the varactor 34. In practice, the center frequency for continuous wave operation of the source 10 is established by adjustment of the longitudinal position shorting block 106 and the penetration of the tuning screw 148 in plate cavity 50. At the same time, the penetration of the tuning screw 156 in relation to the "widget" 152 is adjusted to calibrate the temperature compensating "widget." In addition, the tuning screw assembly 32 represented by variable capacitor 234 is adjusted for the center frequency.

By way of example, in a specific embodiment of my invention, a center frequency of 1338 megacycles was established in the manner prescribed above with a D.C. biasing voltage of +10 volts applied to the varactor 34. By varying this D.C. biasing voltage from +20 volts to +5 volts, FM (frequency modulation) operation over the frequency range of 1338± 10 megacycles is obtained. With 6.3 volts D.C. applied to the filament 222 and +120 volts D.C. applied to plate 56 of tube 54 by connection at 24, output power of 10 to 20 milliwatts was achieved. Output power of 40 to 50 milliwatts was obtained by increasing the anode voltage to +150 volts D.C. and the filament voltage to +6.5 volts D.C.

Rather than FM operation, the operating frequency of the source can be held to a constant value by applying an appropriate value of biasing voltage to the varactor 34. If, due to changes in oscillator loading or temperature changes not fully compensated by the "widget" 152, the frequency changes, adjustment, automatically or manually, of the biasing voltage will electronically restore the source 10 to the desired operating frequency.

The invention thus provides a variable frequency oscillatory source in which the operating frequency is established by varying the parameters of a single distributed parameter circuit. The source is small size and of rugged construction. The various parts are rigidly mounted and thus capable of withstanding vibrational shocks as well as extreme gravitational forces. Being light-weight, approximately one-quarter of pound, the device of the invention is particularly advantageous in applications, such as airborne communications systems, where weight and also size are stringent limitations.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A microwave source comprising, in combination:

(A) an electrically conductive open ended housing, said housing including
- (1) a pair of side walls and one end wall, and
- (2) a partition disposed perpendicularly to said side walls and said one end wall for dividing the interior of said housing into first and second substantially equal resonant cavities, (B) a high frequency triode rigidly mounted in an aperture in said partition, said triode having
- (1) an anode terminal disposed in said first resonant cavity,
- (2) a cathode terminal disposed in said second resonant cavity, and
- (3) a grid terminal electrically coupled to said housing (C) an anode line disposed in said first resonant cavity, said anode line having
- (1) one end adapted to support a contact member in electrical contacting engagement with said anode terminal, and
- (2) its other end rigidly mounted in a support member disposed in the open end of said first resonant cavity, (D) a cathode line disposed in said second resonant cavity, said cathode line having
- (1) one end adapted to support a contact member in electrical contacting engagement with said cathode terminal and
- (2) its other end rigidly mounted in a support member disposed in the open end of said second resonant cavity, (E) feedback means for coupling electromagnetic energy from said first resonant cavity to said second resonant cavity through said partition, said feedback means including
- (1) means forming an aperture in said partition and
- (2) a feedback screw in threaded engagement with said cathode line, said feedback screw extending through said aperture and having an enlarged end portion disposed in said first resonant cavity, (F) output means for extracting electromagnetic energy from said first resonant cavity, and (G) tuning means disposed in said first resonant cavity for varying the resonant frequency thereof.

2. A microwave source comprising, in combination:

(A) an electrically conductive open ended housing, said housing including
- (1) a pair of side walls and one end wall, and
- (2) a partition disposed perpendicularly to said side wall and said one end wall for dividing the interior of said housing into first and second substantially equal resonant cavities, (B) a high frequency triode rigidly mounted in an aperture in said partition, said triode having
- (1) an anode terminal disposed in said first resonant cavity,
- (2) a cathode terminal disposed in said second resonant cavity, and
- (3) a grid terminal electrically coupled to said housing (C) an anode line disposed in said first resonant cavity, said anode line having
- (1) one end adapted to support a contact member in electrical contacting engagement with said anode terminal and
- (2) its other end rigidly mounted in a support member disposed in the open end of said first resonant cavity, (D) a cathode line disposed in said second resonant cavity, said cathode line having
- (1) one end adapted to support a contact member in electrical contacting engagement with said cathode terminal and (2) its other end rigidly mounted in a support member disposed in the open end of said second resonant cavity,
(E) feedback means for coupling electromagnetic energy from said first resonant cavity to said second resonant cavity through said partition,
(F) output means for extracting electromagnetic energy from said first resonant cavity, and
(G) tuning means disposed in said first resonant cavity for varying the resonant frequency thereof, said tuning means including
(1) a varactor supported on said anode line and having one terminal electrically connected thereto,
(2) a terminal cap electrically connected to the other terminal thereof,
(3) a bias conductor electrically isolated from said housing and extending from a terminal external to said housing through said anode line support member to said terminal cap, said conductor being disposed for a substantial portion of its length in a groove in said anode line, and
(4) a tuning screw assembly including
(a) an inner screw for clamping said varactor against said anode line and
(b) an outer tuning screw for varying the capactive coupling between said varactor and said housing.

3. A microwave source comprising, in combination:
(A) an electrically conductive, open ended housing, said housing including
(1) a pair of side walls and one end wall, and
(2) a partition disposed perpendicularly to said side wall and said one end wall for dividing the interior of said housing into first and second substantially equal resonant cavities,
(B) a high frequency triode rigidly mounted in an aperture in said partition, said triode having
(1) an anode terminal disposed in said first resonant cavity,
(2) a cathode terminal disposed in said second resonant cavity, and
(3) a grid terminal electrically coupled to said housing
(C) an anode line disposed in said first resonant cavity, said anode line having
(1) one end adapted to support a contact member in electrical contacting engagement with said anode terminal and
(2) its other end rigidly mounted in a support member disposed in the open end of said first resonant cavity,
(D) a cathode line disposed in said second resonant cavity, said cathode line having
(1) one end adapted to support a contact member in electrical contacting engagement with said cathode terminal and
(2) its other end rigidly mounted in a support member disposed in the open end of said second resonant cavity,
(E) an anode D.C. supply circuit electrically isolated from said housing, said circuit including
(1) a first radio frequency choke,
(2) a first external terminal for facilitating connection between a D.C. anode supply and said first choke, and
(3) an anode lead extending from said first choke to said anode contacting member, said anode lead being disposed in a groove in said anode line for a substantial portion of its length, and
(F) a filament D.C. supply circuit electrically isolated from said housing, and including
(1) a second radio frequency choke,
(2) a second external terminal for facilitating connection between a D.C. filament supply and said second choke,
(3) a filament lead electrically connected at one end to said second choke and at the other end to a first filament terminal of said triode, and
(4) a second filament terminal of said triode being electrically connected to said cathode line,
(G) feedback means for coupling electromagnetic energy from said first resonant cavity to said second resonant cavity through said partition,
(H) output means for extracting electromagnetic energy from said first resonant cavity, and
(I) tuning means disposed in said first resonant cavity for varying the resonant frequency thereof.

4. A microwave source comprising, in combination:
(A) an electrically conductive, open ended housing, said housing including
(1) a pair of side walls and one end wall, and
(2) a partition disposed perpendicularly to said side wall and said one end wall for dividing the interior of said housing into first and second substantially equal resonant cavities,
(B) a high frequency triode rigidly mounted in an aperture in said partition, said triode having
(1) an anode terminal disposed in said first resonant cavity,
(2) a cathode terminal disposed in said second resonant cavity, and
(3) a grid terminal electrically coupled to said housing,
(C) grid circuit means including
(1) a resistor disposed externally of said housing and having a first terminal thereof connected to ground through said housing
(2) a capacitor mounted in one of said side walls and having a first terminal connected to ground through said housing, and
(3) a conductor having one end connected to said grid terminal of said triode and the other end connected in common to the second terminals of said resistor and capacitor, whereby said grid terminal is coupled to ground through said capacitor at radio frequencies and is biased above ground through said resistor for D.C. signals,
(D) an anode line disposed in said first resonant cavity, said anode line having
(1) one end adapted to support a contact member in electrical contacting engagement with said anode terminal and
(2) its other end rigidly mounted in a support member disposed in the open end of said first resonant cavity,
(E) a cathode line disposed in said second resonant cavity, said cathode line having
(1) one end adapted to support a contact member in electrical contacting engagement with said cathode terminal and
(2) its other end rigidly mounted in a support member disposed in the open end of said second resonant cavity,
(F) feedback means for coupling electromagnetic energy from said first resonant cavity to said second resonant cavity through said partition,
(G) output means for extracting electromagnetic energy from said first resonant cavity, and
(H) tuning means disposed in said first resonant cavity for varying the resonant frequency thereof.

5. The device claimed in claim 2 wherein said tuning means further includes
(5) a shorting block disposed about said anode line for terminating said first resonant cavity, said shorting block being (a) slidable along said anode line to establish a center resonant frequency for said first resonant cavity (b) said varactor being operable to vary the resonant frequency of said first resonant cavity over a range of frequencies above and below said center frequency.

6. The device claimed in claim 5 which further includes a second shorting block disposed about said cathode line to terminate said second resonant cavity, said second shorting block being (1) movable along said cathode line to establish a center resonant frequency for said second resonant cavity substantially corresponding to the center resonant frequency established in said first resonant cavity.

References Cited by the Examiner

UNITED STATES PATENTS

| | | | |
|---|---|---|---|
| 2,763,783 | 9/1956 | Lorenzen | 331—98 |

FOREIGN PATENTS

| | | |
|---|---|---|
| 245,526 | 6/1963 | Australia. |

OTHER REFERENCES

Lynn: "AFC circuit for UHF Oscillator," RCA Technical Notes, RCA TN No. 225 Received Sci. Lib. Jan. 5, 1959.

NATHAN KAUFMAN, *Primary Examiner.*

ROY LAKE, *Examiner.*

J. B. MULLINS, *Assistant Examiner.*